United States Patent [19]

Hashimoto

[11] Patent Number: 4,821,308
[45] Date of Patent: Apr. 11, 1989

[54] TELEPHONE ANSWERING SYSTEM WITH PAGING FUNCTION

[75] Inventor: Kazuo Hashimoto, Tokyo, Japan

[73] Assignee: Hashimoto Corporation, Tokyo, Japan

[21] Appl. No.: 841,097

[22] Filed: Mar. 18, 1986

[30] Foreign Application Priority Data

Mar. 19, 1985 [JP] Japan ................................. 60-55225

[51] Int. Cl.$^4$ ............................................. H04Q 7/04
[52] U.S. Cl. ...................................... 379/57; 379/51; 340/825.44
[58] Field of Search ................ 179/2 E, 2 EA, 2 B, 179/18 BE, 18 BF, 84 UF, 2 G, 603; 370/61; 340/825.44, 311.1; 379/57, 51

[56] References Cited

U.S. PATENT DOCUMENTS

| | | | |
|---|---|---|---|
| 4,065,642 | 12/1977 | McClure | 379/77 |
| 4,072,824 | 2/1978 | Phillips | 379/57 |
| 4,178,475 | 12/1979 | Taylor et al. | 179/2 EC |
| 4,313,035 | 1/1982 | Jordan et al. | 179/18 BE |
| 4,336,524 | 6/1982 | Levine | 340/311.1 |
| 4,682,148 | 7/1987 | Ichikawa et al. | 340/311.1 |

*Primary Examiner*—Robert Lev
*Attorney, Agent, or Firm*—Lowe, Price, LeBlanc, Becker & Shur

[57] ABSTRACT

A telephone answering system with paging function is adapted to transmit a prerecorded outgoing message to a calling party through a closed loop of telephone lines established upon reception or a telephone calling signal, and record an incoming message from the calling party after the outgoing message is transmitted. The system operates to receive a signal representative of the caller's telephone number sent from the calling party through the telephone lines to store the same signal in a memory, and then automatically and temporarily release the closed loop, and thereafter reestablish the closed loop for calling a preset telephone number of a paging center. Further, the system transmits the stored signal representing the caller's telephone number to the paging center through the telephone lines upon reception of an answer from the center.

6 Claims, 5 Drawing Sheets

TELEPHONE ANSWERING SYSTEM WITH PAGING FUNCTION

BACKGROUND OF THE INVENTION

The present invention relates to a telephone answering system with a remote message retrieval functon, and more particularly to a system with a paging function.

A telephone answering system which is incorporated with a paging system to page the subscriber away from the office to advice of messages being received from outside callers has been well known. However, the above conventional answering and paging system does not have the function to display caller's telephone number on the paged receiver unit carried by the subscriber. This means that it is inconvenient if the paged subscriber wished to call the caller directly, without first calling his telephone answering system.

SUMMARY OF THE INVENTION

The object of the present invention is to provide a telephone answering system of the type capable of paging out a subscriber absent from his office, through a portable pager carrier by the subscriber when the system receives calls from an unspecified person, the system being further adapted to allow the caller the record his telephone number together with his message, and call the paging center to page the subscriber, and at the same time, according to the instruction of the paging center, caller's telephone number which was stored is transmitted so that the number is visually displayed, as the center pages the subscriber, so as to enable the subscriber to be notified of the caller's telephone number which is visually displayed on the portable pager, and directly contact the caller, without calling the telephone answering system.

According to the present invention, in a telephone answering system with paging function the system comprises means for establishing a closed loop of telephone lines upon reception of an incoming call, mean for sending prerecorded outgoing message to the caller via the closed telephone lines, and means for recording caller's messages sent following transmission of the subscriber's message.

Furthermore, this telephone answering system comprises means for receiving a signal representative of a telephone number of the caller via the telephone lines and for storing said signal, means for automatically and temporarily releasing said closed loop of the telephone lines after storage of said caller's telephone number and thereafter reestablishing the closed loop, means for calling a paging center after reestablishment of the closed loop, and means for transmitting said stored signal representative of the telephone number to the paging center as it answers or instructs.

The advantage of a telephone answering system of present invention which is of the type having paging function and using telephone lines, resides in the ability to put unspecified caller's telephone number in the memory, and send the number to the calling center, so that the caller's telephone number is visually displayed on the subscriber's portable pager when the same portable pager is called out from the paging center.

Therefore, the subscriber can telephone the caller directly, without calling back the telephone answering system to retrieve the telephone number which was stored on the recording medium. So it gives a shorter access time, as well as a simplified means of returning calls and improved practicality.

DETAILED DESCRIPTION

With reference to the accompanying drawing, a preferred embodiment of the present inventio wil be now described.

Figure 1:
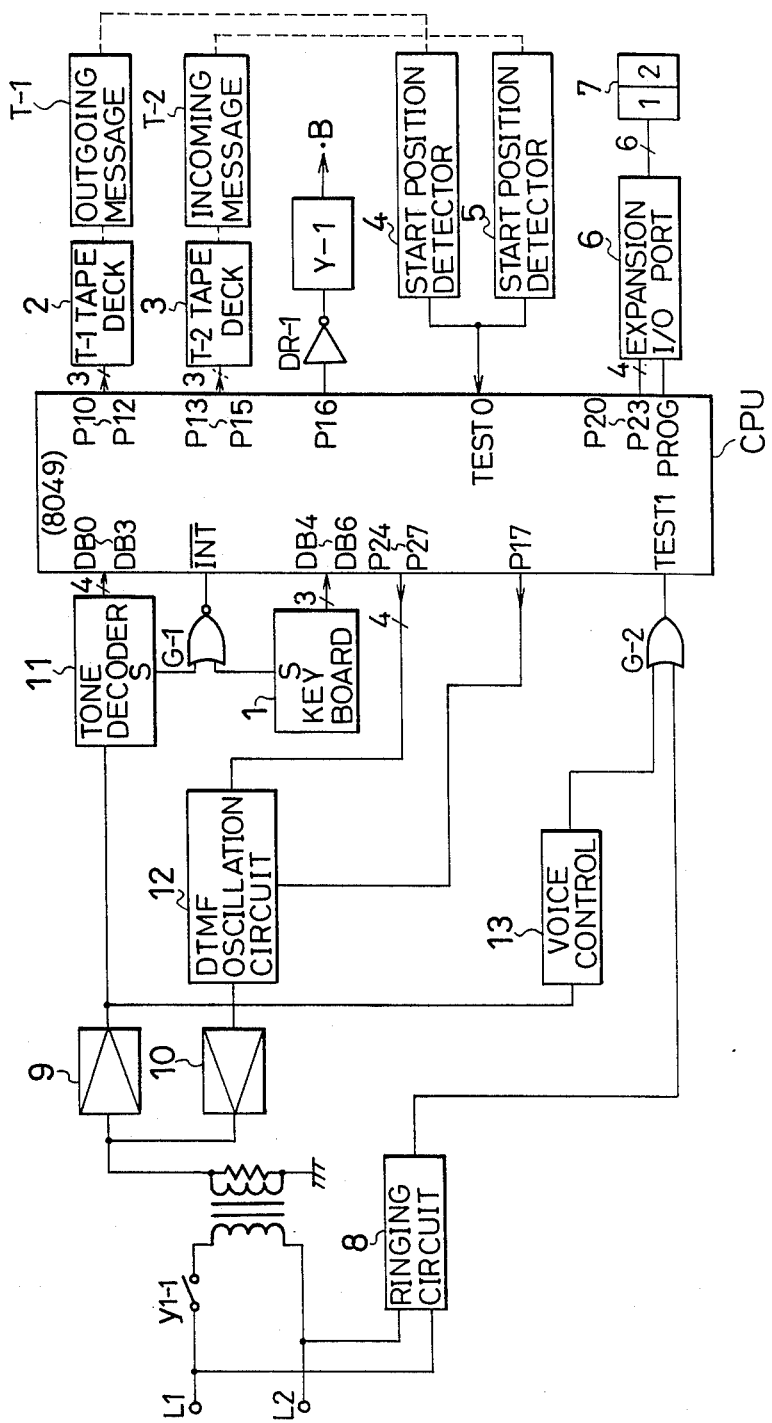
FIG. 1 shows a block diagram of a paging function installed telephone system, according to an embodiment of the present invention.

In FIG. 1, reference numeral CPU is a microprocessor, which is composed of an INTEL 8049 microprocessor in this embodiment. Data bus DB0–DB6 are used as input ports, and P10–P17, and P20–P27 are used as output ports. Also, $\overline{INT}$ is used as an interrupting terminal, and TEST 0, TEST 1 as input terminals for counting.

Reference numeral 1 is a keyboard section consisting of keys includes a key to set this telephone answering unit 100 (FIG. 5), to the operational mode to record the answering message on an outgoing message tape T-1 of a type having opposite ends, a key to set the telephone answering unit to the automatic mode (commonly called AUTO), etc.

Reference numeral 2 is the drive of the outgoing message tape T-1. Depending on how the bit of the output port P10–P12 is raised, it will wind the outgoing message tape T-1 at a regular speed, rewind, or wind at a high speed.

Reference numeral 3 is the drive of an incoming message tape T-2. Reference numeral 4 is the a start point detector of the outgoing tape T-1, which is so linked to rotation of a reel (not shown) as to generate a series of pulses to the outgoing tape T-1 while it is running.

The frequency of the generated pulse is then detected with a program executed by the microprocessor CPU, which is inputted through the terminal TEST 0, and makes a judgment as to whether or not the outgoing tape T-1 is in the middle of its movement, or has reached the beginning or end.

5 is a start point detector of the incoming tape T-2.

6 is an I/O port for expansion. 7 is a digital switch linked to the I/O port 6. At the time of remote control, mentioned later, the switch 7 enables normal remote control operation when the tone which matches the set number, is inputted from the push-button telephone.

L1, L2 are telephone lines, and LT is a line transformer. 8 is a ringing circuit to detect a call signal coming from L1, L2. 9 and 10 are amplification circuits. 11 is a tone decoder which detects the tone of the push-button telephone comes in from L1, L2, and outputs it after converting it to a corresponding binary code.

12 is a DTMF oscillation circuit which oscillates a dual tone which matches the tone of the push-button telephone. After appointing an address of circuit 12 by a control output which appears at the output port P24–P27 of the microprocessor CPU, when one pulse is supplied to the circuit 12 from output port P17, a dual tone which matches the appointed address is oscillated.

13, which will be explained in more detail later, is a voice control to detect the caller's voice, dial tone during signaling, and the beep tone. Here, descriptions of a circuit for audio components, namely for recording the outgoing message, reproduction, and recording the caller's incoming message are omitted as they have been commonly known.

Figure 2:
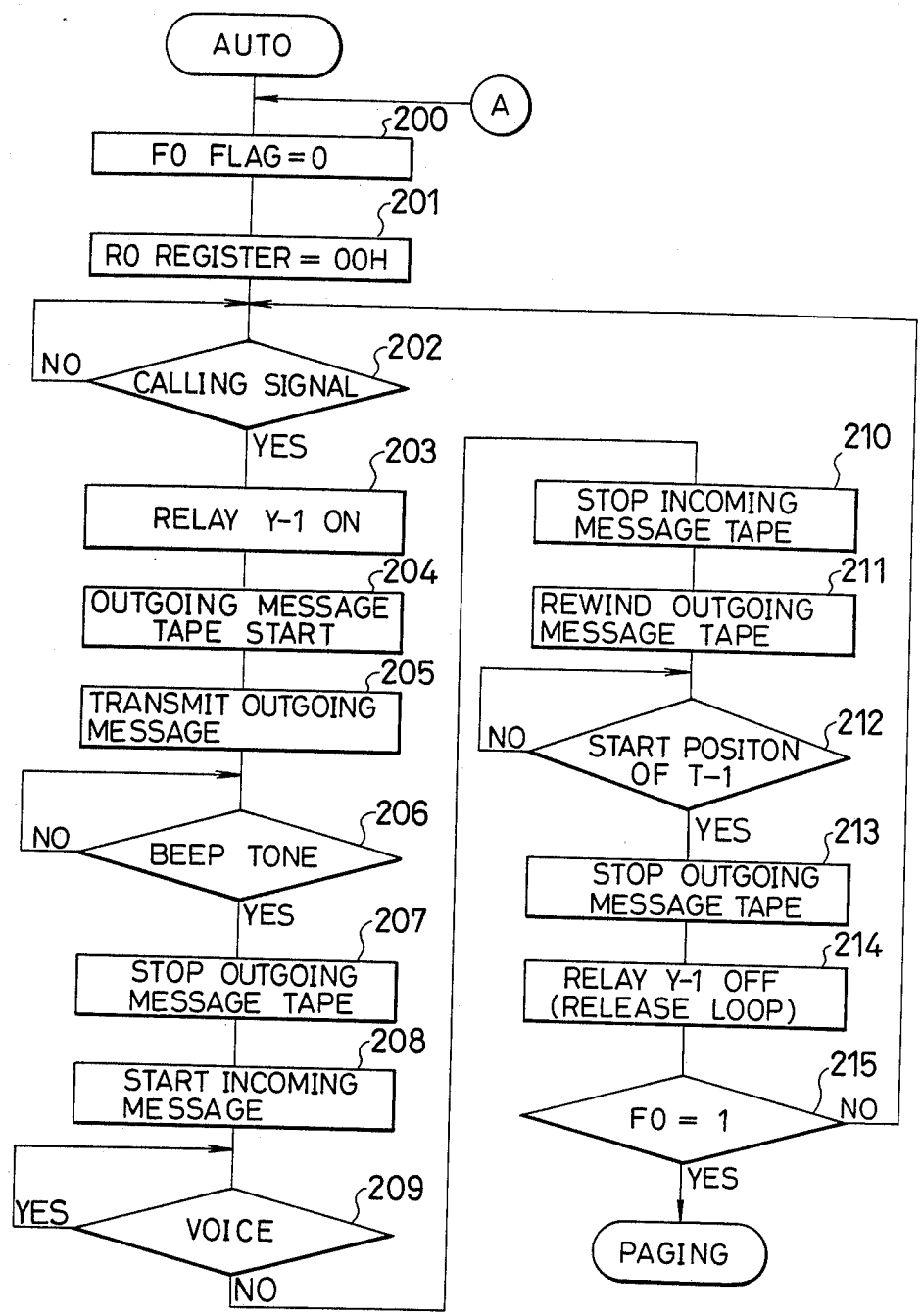
FIG. 2 is a flow chart of a control program executed by the microprocessor shown in FIG. 1.
Figure 3:
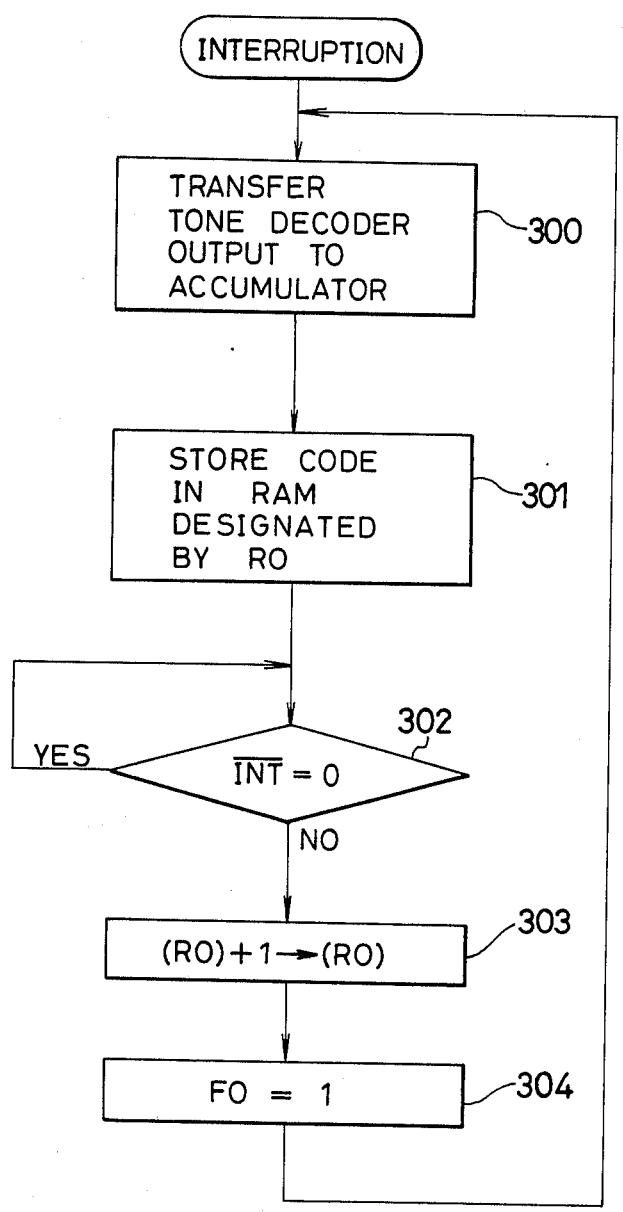
FIG. 3 is a flow chart of an interruption processing program executed by the microprocessor to store caller's telephone number.

This system is configured from the above listed components. Next, the function will be explained in detail, referring to flow charts in FIG. 2 to FIG. 4.

We assume that the outgoing message tape T-1 has a recorded message, recorded in the normal manner, with the beep tone at the end of the message. The outgoing message usually begins: "This is Hashimoto Corporation. I regret I am out at the moment. Please record your message after the signal. If it is urgent, please enter your telephone number, and I will get back to you. Thank you."

Then, operate the keys on the Keyboard 1, and set the telephone answering system to the automatic answering and recording mode, the so called AUTO position. Here, at Step 200 of FIG. 2, the FO flag, which is stored in the flag register installed in the microprocessor CPU, is cleared to "0". This FO flag is to store in the memory caller's telephone number when the calling part records his number after his message from the push-button telephone he is using.

Next, at Step 201 the RO register is cleared, which is one of the registers installed in the microprocessor CPU. This RO register is to designate an address area in the RAM in which caller's telephone number is stored.

In the INTEL 8049 which is used in this system, a 128 byte RAM is installed, and when the RO register is at "00", the 128 byte RAM's first telephone number storage area RAM 0, can be designated.

Next, Step 202, is the condition to wait for an incoming call signal. When the call signal comes into telephone lines L1, L2 in FIG. 1, the call signal is detected at the ringing circuit 8, then through an OR gate G-2, and the microprocessor CPU's terminal TEST 1, the call signal is supplied to the microprocessor. When, at Step 202, it is judged that the call signal arrived, at Step 203, the microprocessor CPU will change the output pulse level of the output port P16 to "1", and via a drive DR-1, will maintain a relay Y-1 in the ON position. Consequently, through a contact Y-1 of relay Y-1, and the telephone lines L1, L2 a loop condition is established, causing the call signal to stop ringing, and assume the conversation condition.

Then microprocessor CPU operates to output a "1" level from the output port P10 to the drive 2 to actuate the drive 2 so as to start winding the outgoing message tape T-1 (Step 204), then the outgoing message recorded on the tape T-1, through the reproduction circuit, (not shown in the Figure as it has been commonly known), is sent to the telephone of the caller via the telephone lines L1, L2 (Step 205). Later, when the beep tone recorded at the end of the outgoing message is sent to the microprocessor CPU via the voice control 13, OR gate G-2, and terminal TEST 1, and then detected at Step 206 of this program, an output at the "1" level is outputted to the tape drive 3 from the output port P13 after the outgoing message tape T-1 is stopped to run at Step 207. The drive 3 then starts to drive the incoming message tape T-2, and with the standard procedure, the caller's message is recorded on the tape T-2 (Step 208). This recording condition is maintained until the caller's voice, supplied via the voice control 13 is interrupted for more than seven seconds (Step 209).

After this, following the directions in the outgoing message, if the calling party enters his telephone number from the push-button telephone he is using continuously, and when the first tone which represents the highest digit of his telephone number is identified by the tone decoder 11, via the amplification circuit 9, interruption will be made to the NOR gate G-1 with an output from the strobe terminal 8, and to the microprocessor CPU via the terminal $\overline{\text{INT}}$. The program flows into the flow chart shown in FIG. 3.

First, at Step 300, the microprocessor CPU is applied at its data bus DB0–DB3 the binary coded output of the tone decoder 11, which is then transferred to the accumulator of the microprocessor. Then, at Step 301, the code inputted to the accumulator is stored in the RAM address area appointed by the RO register. As previously mentioned, the initial value of the RO register is "00", therefore the first code outputted from the tone decoder 11 will be stored in the address area RAM 0.

Next, Step 302; according to the level of signal sent to the interruption terminal $\overline{\text{INT}}$ from a terminal S of the tone decoder via the Gate G-1, a judgment will be made as to whether or not the sending of the first digit tone has been stopped.

Thus, after the first digit of the telephone number is sent, at Step 303, the RO register is incremented by +1, and at Step 304, the FO flag is set to "1" to store in the memory and remember that the telephone number of the caller has been sent.

The above operation is repeated each time one of the representative digits of the telephone number is sent successively from the caller. Ultimately, the first digit of the telephone number will be stored in RAM 0, the second digit in RAM 1, the third digit in RAM 2, and so on, successively. Also, the total number of digits of the telephone number will be stored in the RO register. Therefore, even if different digits of the telephone number were recorded and the telephone number from the previous time or a similar number were recorded, and the lower digit of telephone number from a previous call remained in the higher digit address area of the RAM, there would be no confusion, as will be explained later.

When the interruption operation (described above) is completed, this program will return to Step 209. When a set time lapse after the voice of the calling party or the push-button telephone tone has faded (and the telephone number has been recorded on the incoming message tape T-2), the tape T-2 stops to wind at Step 210. At Step 211, rewinding of the outgoing message tape T-1 is initiated. When the tape, T-1 has been rewound to the beginning, the tape T-1 is caused to stop (Steps 212 and 213), and at Step 214 the relay Y-1 is deenergized releasing the loop of the telephone lines L1, L2. Then at Step 215, a test is conducted to see if the FO flag is set at "1". This is to judge if the telephone number of the caller has been sent, as sometimes when the caller does not consider the situation urgent, he only leaves a message and not his telephone number.

When the caller does not input his telephone number, the FO flag remains at "0", so it will resume the waiting condition of Step 202.

Figure 4:
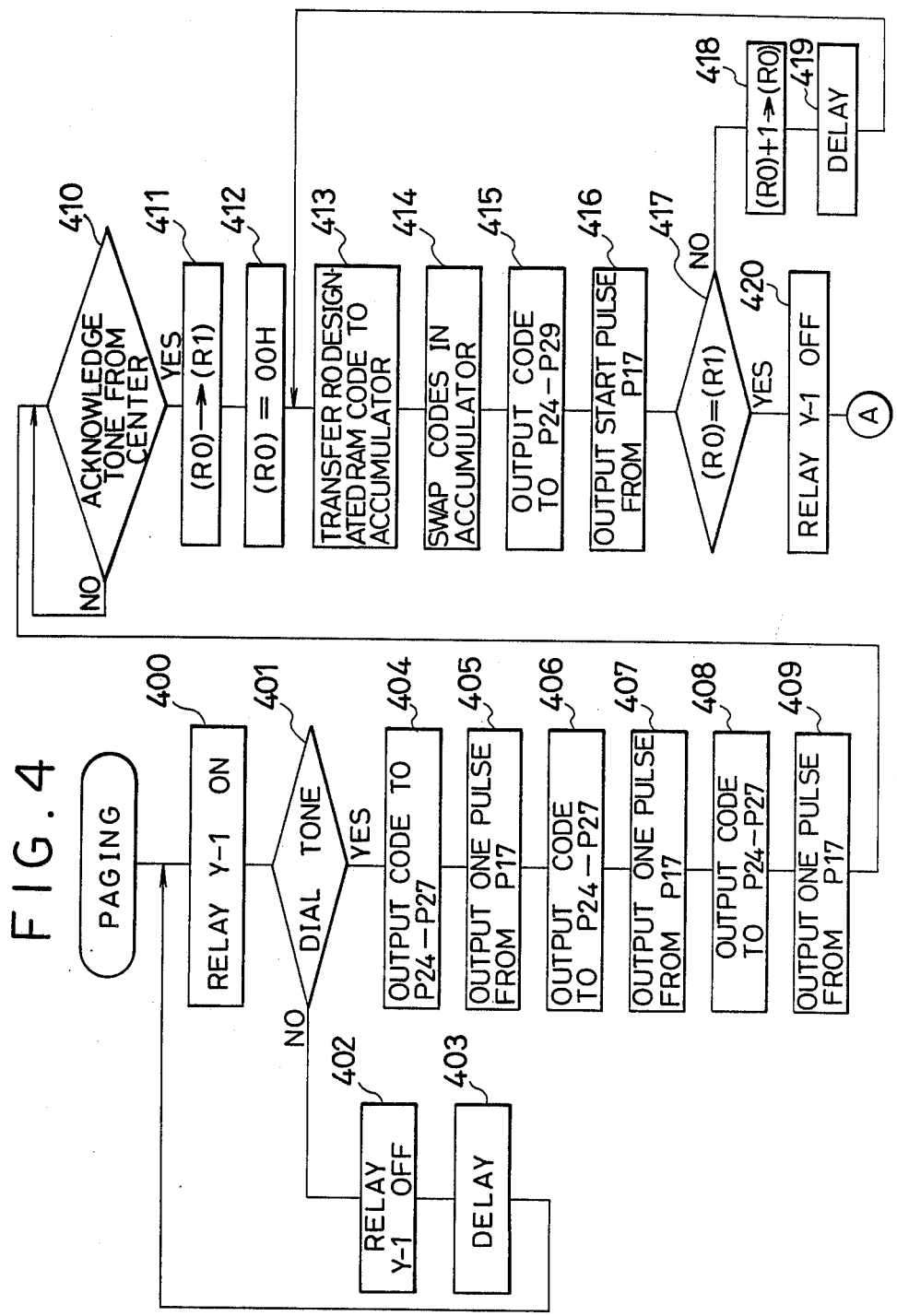
FIG. 4 is a flow chart showing the program to send caller's telephone number to the paging center, as the paging function of the telephone answering system operates.

On the other hand if the FO flag is set at "1", or in other words when a telephone message has been recorded, it will move on to the paging operation shown in the flow chart in FIG. 4. This means that at Step 400 the relay Y-1 is turned ON and a loop is formed on the telephone lines L1, L2 and the telephone office.

Then a dial tone is transmitted from the office, so it will identify this (Step 401). If the dial tone is not received at Steps 402 and 403, it is reclosed after a set period (several seconds). If the dial tone is detected in order to call the paging center, an abbreviated dial tone *00 is transmitted at Steps 404–409. This abbreviated dial tone has to be registered with the office for paging operation.

At Step 404, the code which matches (*) is applied to the input terminal of the DTMF oscillation circuit 12 from the output ports P24–P27. In this condition, when one pulse is applied to the DTMF oscillation circuit 12 from output port P17 (Step 405), a tone which matches (*) of the push-button telephone is outputted from the oscillation circuit 12 for a set period, and is then transmitted to the office via the amplifier circuit 10 and the line transformer LT. Then the single tone which matches (0) is sent twice in the same way (Steps 406–409), and this calls the paging center. When the paging center is called, messages are sent from the paging center to the telephone answering system, which will not react to the message. However, the acknowledge tone (like beep tone) at a certain frequency sent from the paging center, after the message, will be detected at Step 410.

When this acknowledge tone is detected, in order to send the calling party's telephone number, the value of the RO register is first transmitted to the RI register at Step 411 for the following process, and at Step 412 the RO register is cleared.

Therefore, at Step 413, the RAM address area RO register designates the first will be RAM 0, and the code of the first digits of the caller's telephone number stored in the RAM O area is transmitted to the accumulator. Then at Step 414, the codes transmitted to the accumulator in the above mentioned order undergoes a SWAP, namely an exchange of the lower 4 bits and upper 4 bits. This is in relation to the output ports p24–p27 at the next Step. At Step 415, the swapped code of the telephone number is outputted to the output ports p24–p27 by an output command, and then applied to the input terminal of the DTMF oscillation circuit 12. In this condition when one pulse is outputted from the output port P16 (Step 416), the first digit of the caller's telephone is transmitted to the paging center as in the case of an abbreviated dial. Furthermore, at Step 417, by comparing the value of the RO register and that of the R1 register, it is tested if the sending of all digits of the telephone number in the memory have been completed. If not completed the program flows to Step 418 to give an increment value to the RO register by +1, and after going through a lapse delay time of a minimum pause, the program returns (from Step 419) to Step 413. Then the second digit of the telephone number is sent out. By repeating this operation, when the sending of all the digits of the telephone number is completed at Step 417, the value of the RO register and the R1 register becomes the same. At Step 420, the relay Y-1 is turned off, which releases the loop of the telephone lines L1, L2 and then the program returns to Step 200 to clear the FO flag and RO register to prepare for the arrival of the next pulse.

Meanwhile, the telephone number sent to the paging center in the above mentioned manner, will be displayed in the window of the portable pager. This kind of paging system is commonly known, for example in U.S. Pat. No. 4,065,642.

Figure 5:
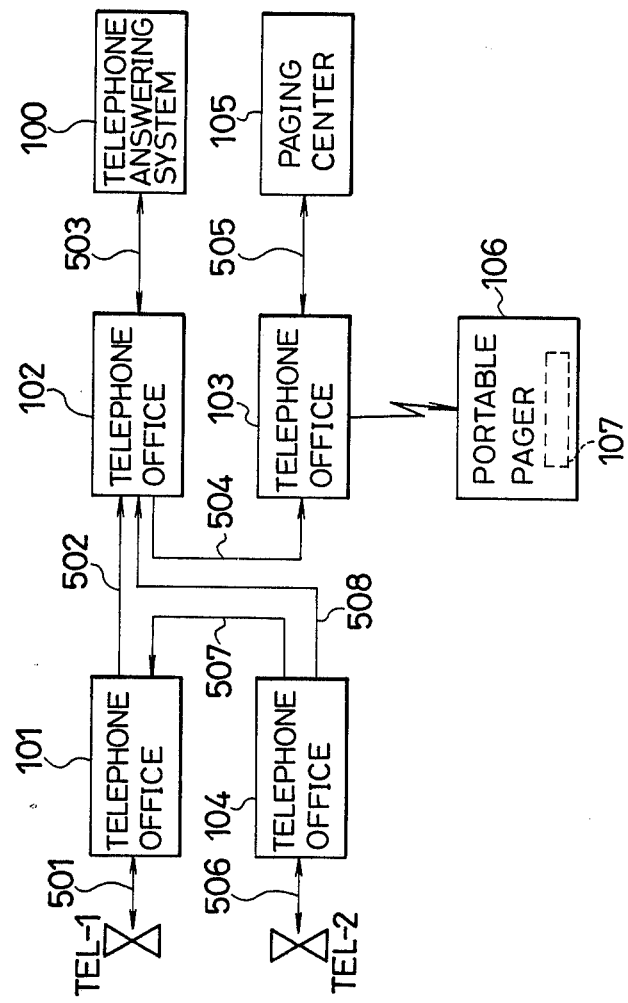
FIG. 5 is a system diagram for the paging operation of the telephone answering system.

Next, FIG. 5 shows the operations mentioned above in a distribution diagram. At first an unspecified caller calls the telephone answering system 100, from his telephone TEL-1 (unspecified) via the telephone line 501, sending telephone office 101, telephone line 502, receiving telephone office 102, and telephone line 503 corresponding to the telephone lines L1, L2. The telephone answering system 100 now transmits the outgoing message, and when the caller's incoming message comes in, the incoming message is recorded on the incoming message tape.

While the telephone answering system 100 is carrying out the operation described, the caller's telephone number, sent by the calling party will be put into the memory. Later the telephone answering system will recover, once, but then reclose the telephone line 503; and via the telephone office 102, the telephone line 504, the telephone office 103, and the telephone line 505; automatically call the paging center 105. After the paging center 105 answers, the telephone number in the memory will be automatically sent out to the paging center 105. At the paging center 105, after the telephone line 505 is released, it will reclose the telephone line 505 and via telephone office 103, call the portable pager 106, and the telephone number sent from the telephone answering system 100 is sent to the portable pager 106, and displayed on the display window 107.

By looking at the telephone number displayed on the display window, the person carrying the portable pager can go to the nearest telephone TEL-2, and call telephone TEL-1; via the telephone line 506, the telephone office 104, the telephone line 507, the telephone office 101 and the telephone line 501.

When he gets no answer from the telephone TEL-1, he can call his telephone answering system 100, via a telephone line 508, to hear callers' messages recorded on the telephone system 100.

With this telephone answering system, remote operation is possible. Although it is not shown in the flow chart, every time a pulse arrives, it will read a two-digit code (ie (12) in the figure) of the digital switch 7 into the register (ie register R7 inside the microprocessor CPU via the expansion I/O port 6.

When the number of the push-button telephone sent by the subscriber coincides with the code (mentioned above) via the tone decoder 11, remote control becomes possible. Rewinding and reproduction of the receiving tape is carried out by a specific one-digit number, and it becomes possible to retrieve callers' messages recorded on the incoming message tape.

Also, the expansion I/O port is connected exactly as described in the INTEL 8049 Manual, which is used in this embodiment, and the timing of the operation is designed to be automatically handled within the microprocessor CPU.

What is claimed is:
1. For a telephone answering device having:
  (a) means for establishing a closed loop of telephone lines, upon reception of an incoming telephone call;
  (b) means for transmitting a prerecorded outgoing message to a caller; and

(c) means for recording a caller's voice message whereby the subscriber can obtain the caller's recorded voice message;

a means for providing at the telephone answering device a paging function, comprising:

means for receiving a signal representative of a caller's telephone number sent by the caller, before or after the message, and storing said signal;

means for automatically, temporarily releasing the closed loop after said signal is received and stored, and for reestablishing the closed loop of the telephone line;

means for dialing a paging center after reestablishment of the closed loop of the telephone lines; and means for transmitting said stored signal representative of the caller's telephone number, to the paging center via telephone lines, when the paging center answers and requests the telephone answering system to send said stored signal and; a portable receiver unit, adapted to be called by the paging center, with a display window for displaying a telephone number corresponding to said signal sent from the caller to the telephone answering device.

2. A system according to claim 1, wherein said device includes remote control means for controlling the device via the telephone lines, thereby enabling a subscriber called by the paging center to call the telephone answering device by using the remote control to hear the caller's message and telephone number recorded on the telephone answering device.

3. A device according to claim 1, wherein said recording means includes a recording medium, said recording and storing means including a storage medium, said recording medium and said storage medium being of the same type of medium.

4. A device according to claim 1, wherein said recording means includes a recording medium, said recording and storage means including a storage medium, said recording medium and said storage medium being of different types of medium.

5. A paging system, comprising:
a paging center;
a telephone answering device;
said telephone answering device including:
 (a) means for transmitting a prerecorded outgoing message to a caller, via a closed loop of telephone lines, upon reception of an incoming telephone call, and for recording a caller's voice message whereby the subscriber can obtain the caller's recorded voice message;
 (b) means for receiving, via the telephone lines, a signal representative of a caller's telephone number sent after the answering message is transmitted, and for storing said signal;
 (c) means for automatically, temporarily releasing the closed loop of the telephone lines, and for reestablishing the closed loop of the telephone lines after said signal is received and stored;
 (d) means for calling the paging center, after said closed loop of the telephone lines is reestablished; and
 (e) means for transmitting said stored signal to the paging center via the telephone lines, when the paging center answers and produces an acknowledge tone;
a portable receiver unit, adapted to be called by the paging center, with a display window for displaying a telephone number corresponding to said signal sent from the caller to the telephone answering device;
whereby the subscriber through the portable receiver unit is notified of the caller's telephone number via the portable receiver unit and can directly call and talk to the caller from outside the subscriber's office.

6. A system according to claim 1, wherein said signal representative of the caller's telephone number and transmitted upon request of the paging center consists of a series of characters comprising a predetermined combination of numerals and symbols.

* * * * *